US008915713B2

(12) United States Patent
Boyer

(10) Patent No.: US 8,915,713 B2
(45) Date of Patent: Dec. 23, 2014

(54) OFFSET COUNTERBORE FOR AIRFOIL COOLING HOLE

(75) Inventor: Bradley Taylor Boyer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 848 days.

(21) Appl. No.: 13/245,990

(22) Filed: Sep. 27, 2011

(65) Prior Publication Data

US 2013/0078110 A1 Mar. 28, 2013

(51) Int. Cl.

*F01D 5/18* (2006.01)
*B23P 15/02* (2006.01)
*F01D 5/28* (2006.01)

(52) U.S. Cl.

CPC ................ *F01D 5/186* (2013.01); *F01D 5/288* (2013.01); *F05D 2260/202* (2013.01); *F05D 2230/11* (2013.01); *F05B 2250/70* (2013.01)
USPC .... 416/97 R; 416/96 R; 416/97 A; 416/96 A; 416/232; 416/241 R; 415/115; 29/889.72; 29/889.721

(58) Field of Classification Search

USPC ...... 416/97 R, 96 R, 97 A, 96 A, 241 R, 232; 415/115; 29/889, 889.72, 889.721
See application file for complete search history.

(56) References Cited

U.S. PATENT DOCUMENTS

| | | | | | |
|---|---|---|---|---|---|
| 4,738,588 | A * | 4/1988 | Field | ........................... | 416/97 R |
| 4,743,462 | A | 5/1988 | Radzavich et al. | | |
| 5,985,122 | A | 11/1999 | Conner | | |
| 6,042,879 | A | 3/2000 | Draghi et al. | | |
| 6,092,982 | A * | 7/2000 | Ikeda et al. | .................. | 415/115 |
| 6,155,778 | A * | 12/2000 | Lee et al. | ...................... | 415/116 |
| 6,183,811 | B1 | 2/2001 | Conner | | |
| 6,616,405 | B2 * | 9/2003 | Torii et al. | ................... | 416/97 R |
| 6,994,514 | B2 * | 2/2006 | Soechting et al. | ............ | 415/115 |
| 7,204,019 | B2 * | 4/2007 | Ducotey, Jr. et al. | ........ | 29/889.1 |
| 7,789,625 | B2 * | 9/2010 | Liang | .......................... | 416/97 R |
| 7,820,267 | B2 * | 10/2010 | Fahndrich | ................... | 416/97 A |
| 7,950,902 | B2 * | 5/2011 | Camhi et al. | ................ | 416/97 R |
| 8,066,484 | B1 * | 11/2011 | Liang | .......................... | 416/97 R |
| 2005/0215686 | A1 | 9/2005 | Fernihough et al. | | |

* cited by examiner

*Primary Examiner* — Igor Kershteyn
(74) *Attorney, Agent, or Firm* — Sutherland Asbill & Brennan LLP

(57) ABSTRACT

The present application thus provides an airfoil for use in a turbine. The airfoil may include a wall, an internal cooling plenum, and a cooling hole extending through the wall to the cooling plenum. The cooling hole may include an offset counterbore therein.

17 Claims, 5 Drawing Sheets

OFFSET COUNTERBORE FOR AIRFOIL COOLING HOLE

TECHNICAL FIELD

The present application and the resultant patent relate generally to gas turbine engines and more particularly relate to offset counterbores for airfoil cooling holes for use as a coating collector while ensuring that a cooling airflow may pass therethrough.

BACKGROUND OF THE INVENTION

Airfoils of turbine blades and vanes generally may have a number of cooling holes therein to provide a flow of cooling air to the exterior surfaces of the airfoil and the like. Due to the severe temperatures and conditions in which the turbine airfoils generally operate, protective coatings are often applied to the airfoil and related components after manufacture. Various types of protective coatings may be known. These protective coatings generally are sprayed onto the airfoil and the related components.

One issue with the application is such protective coatings, however, is that the spray may plug one or more of the cooling holes. In order to avoid such, various types of masks and the like may be used to cover the cooling holes during the application of the spray coating. These masks, however, may be difficult and time consuming to apply and remove. Other known practices include the use of a counterbore around at least the opening of the cooling holes so as to act as a "coating collector", i.e., the spray may accumulate within the counterbore but leave a main passage through the cooling hole open for the cooling air. Although these coating collectors may be effective, typical counterbore designs may break into the casting cavity as airfoil walls become increasingly thinner.

There is thus a desire for an improved airfoil design with cooling holes therein. Preferably, such an airfoil design may provide cooling holes that can accommodate the application of a protective spray coat with increasingly thinner airfoil walls.

SUMMARY OF THE INVENTION

The present application and the resultant patent thus provide an airfoil for use in a turbine. The airfoil may include a wall, an internal cooling plenum, and a cooling hole extending through the wall to the cooling plenum. The cooling hole may include an offset counterbore therein.

The present application and the resultant patent further provide a method of manufacturing an airfoil for use with a turbine. The method may include the steps of positioning a cooling hole in a wall of the airfoil in communication with an internal cooling plenum, providing the cooling hole with a metering hole and an offset counterbore, spraying a coating onto the airfoil, accumulating an amount of the coating within the offset counterbore, and maintaining the metering hole unobstructed by the coating.

The present application and the resultant patent further provide a turbine component. The turbine component may include a wall with an outer surface, an internal cavity, and a number of cooling holes extending through the wall from the outer surface to the internal cavity. Each of the cooling holes may include a metering hole and an offset counterbore extending away from the outer surface.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
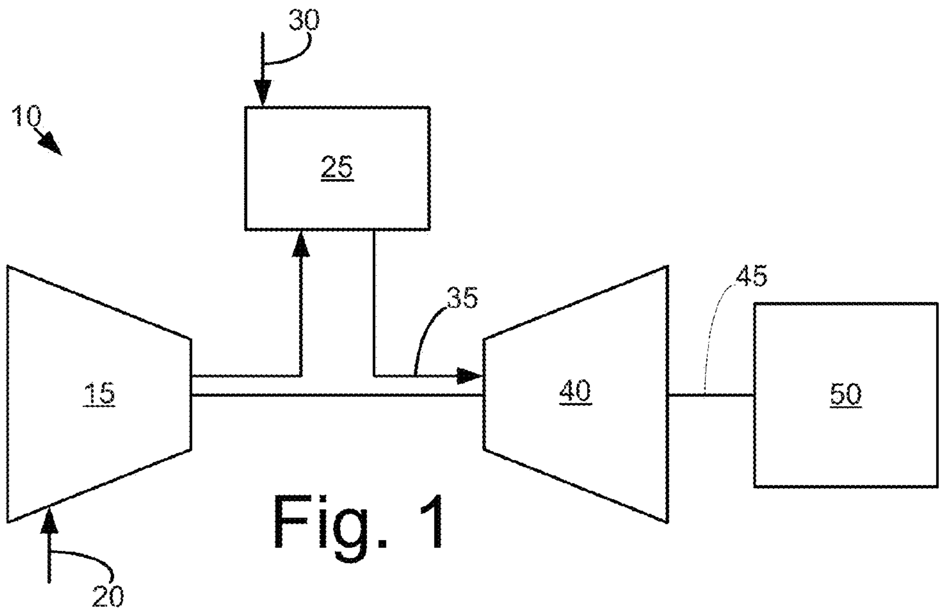
FIG. 1 is a schematic diagram of a gas turbine engine having a compressor, a combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
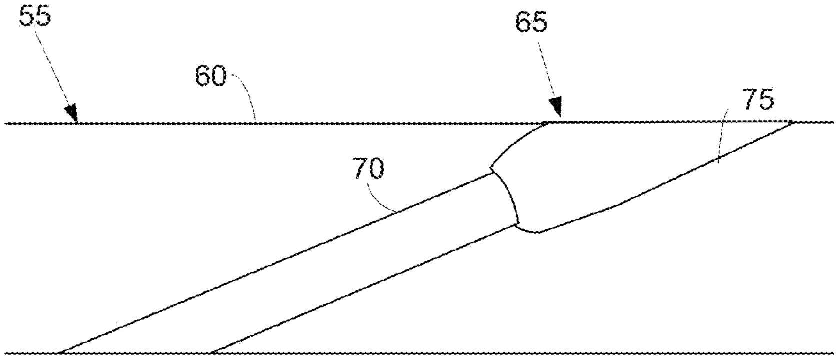
FIG. 2 is a side view of an airfoil with a cooling hole extending therethrough.
Figure 3:
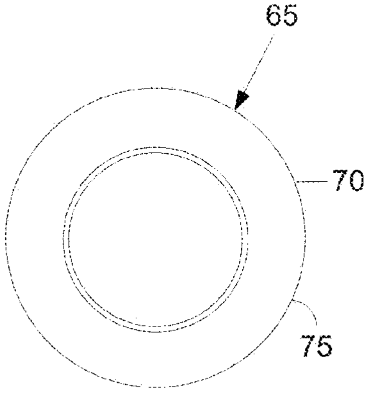
FIG. 3 is a front plan view of the cooling hole of FIG. 2.

FIG. 2 and FIG. 3 show a portion of an airfoil 55 that may be used with the turbine 40 described above and the like. The airfoil 55 includes an outer wall 60. The outer wall 60 includes one or more cooling holes 65 extending therethrough. Any number of cooling holes 65 may be used. The cooling holes 65 may have a metering hole 70 extending therethrough. The metering hole 70 may be sized for the desired air flow rate therethrough. The cooling holes 65 further may include a counterbore 75 about the outer wall 60 thereof. As is shown in FIG. 3, the counterbore 75 largely surrounds the main shaft 70 in a concentric or co-axial fashion. As described above, the counterbore 75 may act as a coating collector so as to allow any of the spray coating to accumulate therein while allowing the metering hole 70 of the cooling hole 65 to remain open for the passage of an adequate amount of cooling air therethrough. The cooling hole 65 may be produced by drilling, EDM (Electric Discharge Machining), and similar types of manufacturing techniques. Other components and other configurations may be used herein.

Figure 4:
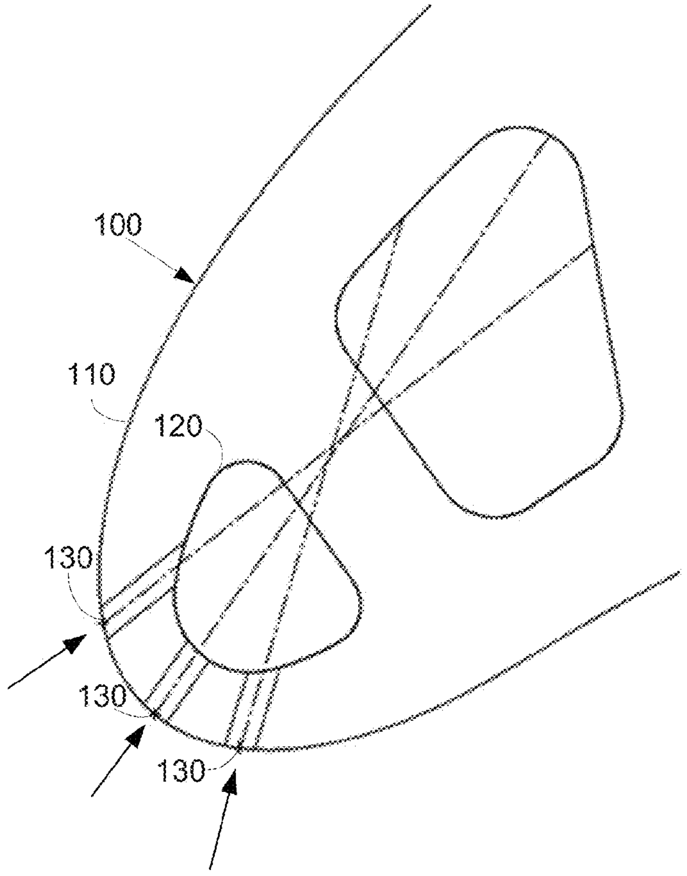
FIG. 4 is a top cross-sectional view of an airfoil with a number of cooling holes.

FIG. 4 shows a portion of an airfoil 100 as may be described herein. The airfoil 100 may include a wall 105 with an outer surface 110. The airfoil 100 also may include one or more internal cooling plenums 120. The internal cooling plenums 120 may be in communication with the flow of air 20 from the compressor 15 or other source. The airfoil 100 also may include a number of cooling holes 130 therein. The cooling holes 130 may extend from the outer surface 110 of the wall 105 to one of the internal cooling plenums 120 and the like. The airfoil 100 may be any type of turbine component such as a bucket or a nozzle. Other components and other configurations may be used herein.

Figure 5:
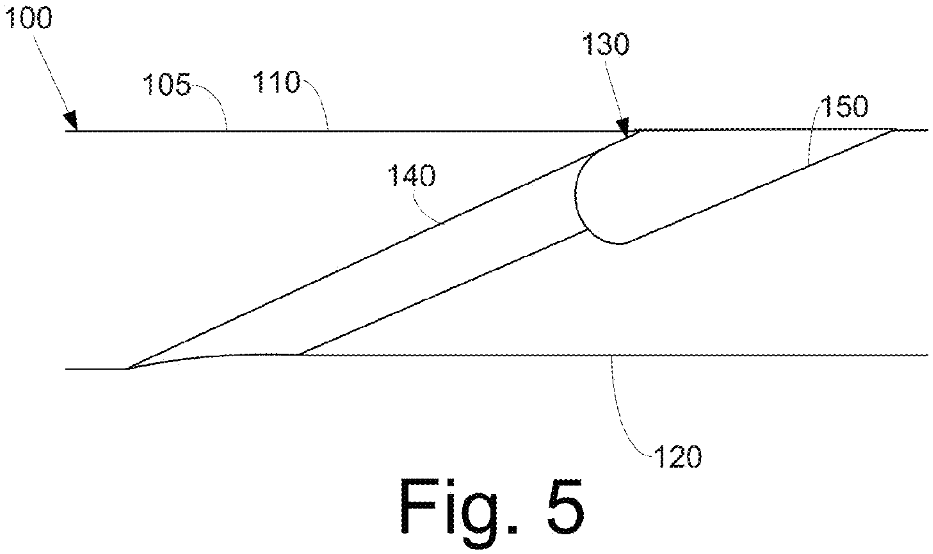
FIG. 5 is a side view of a cooling hole with an offset counterbore as may be described herein
Figure 6:
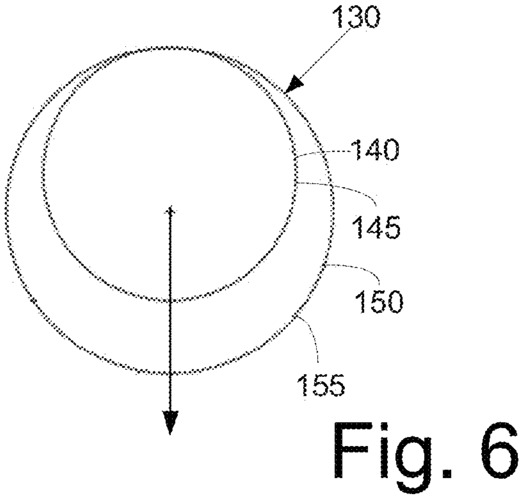
FIG. 6 is a sectional view of the airfoil of FIG. 5.

FIG. 5 and FIG. 6 show examples of the cooling holes 130 as may be used herein. As is shown, each of the cooling holes 130 includes a metering hole 140. The metering hole 140 may be sized for the desired air flow therethrough. Each of the cooling holes 130 also may have an offset counterbore 150 therein. The offset counterhore 150 may have an offset position with respect to the outer surface 110 such that one side of the metering hole 140 extends to (or close to) the outer surface 110. The offset counterbore 150 may have the same size as the standard counterbore 75 described above, but the effective depth towards the cooling plenum 120 may be less so as to prevent breakthrough. The metering hole 140 may have a largely circular shape 145. Likewise, the offset counterbore 150 may have a largely circular shape 155. The metering holes 140 and the offset counterbores 150 of the cooling holes 130 may be produced by drilling, EDM (Electric Discharge Machining), and similar types of manufacturing techniques. Other components and other configurations may be used herein.

Figure 7:
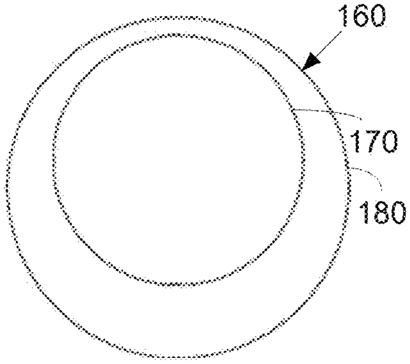
FIG. 7 is a sectional view of an alternative embodiment of a cooling hole as may be described herein.

FIG. 7 shows an alterative embodiment of a cooling hole 160. In this example, the cooling hole 160 includes a metering hole 170 and an offset counterbore 180. In this example, the offset counterbore 180 is not quite as offset towards the outer surface 110 as that shown in FIG. 6. As such, the main shaft 170 does not continue all the way to the outer surface 110. Other lengths, angles, and other types of offsets may be used herein.

Figure 8:
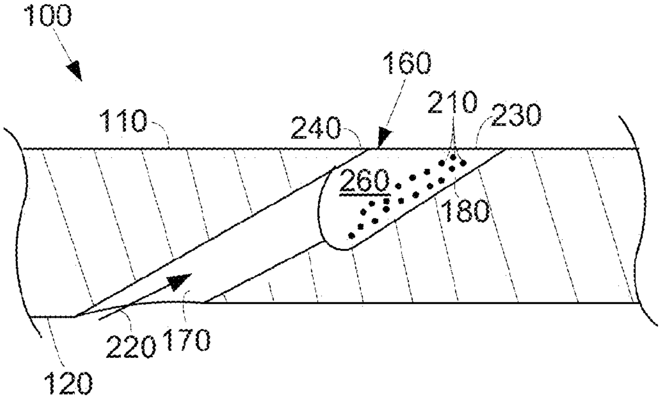
FIG. 8 is a side cross-sectional view of a cooling hole as may be described herein.

As is shown in FIG. 8, the cooling holes 130, 160 described herein and the like thus may use the offset counterbores 150, 180 as a coating collector 200 so as to collect an amount of a spray coating 210 therein while leaving the metering holes 140, 170 clear for a cooling flow 220 therethrough. The offset counterbores 150, 180 thus may collect the spray coating 210 about a backside 230 of the cooling holes 130, 160 without removing material from a front side 240 of the cooling holes 130, 160. The front side 240 likewise functions to shield the cooling holes 130, 160 from being plugged by the spray coating 210.

The offset counterbores 150, 180 also allow the cooling holes 130, 160 to be used with airfoils 100 having thinner walls 105. The use of the thinner walls 105 may be beneficial in terms of lowering wall temperatures, thermals strains, and airfoil pull loads. Other depths may be used herein. The use of the offset counterbore may allow the walls 105 to be made thinner by an amount approximately equal to the coating thickness applied. The walls 105 thus may have a minimum depth of about 0.03 inches (about 0.762 millimeters). Given such, the airfoil 100 described herein may promote higher efficiencies, longer component life with lighter, less expensive parts. The cooling holes 130, 160 also prevent breakthrough while maintaining hole shadowing and metering length.

Figure 9:
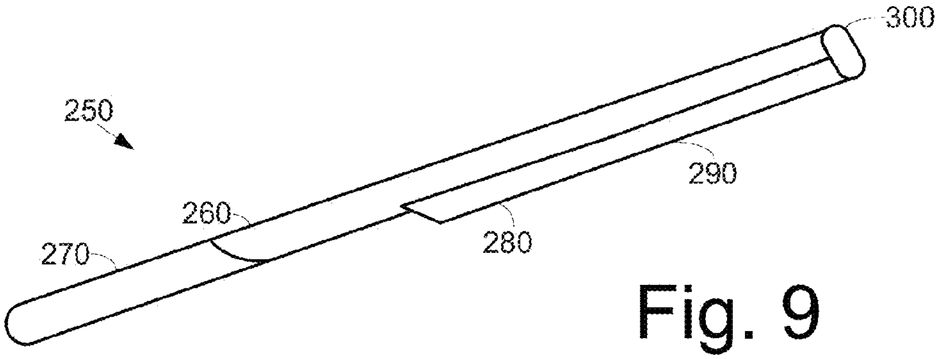
FIG. 9 is a side view of an alternative embodiment of a cooling hole as may be described herein.

FIG. 9 shows a further example of a cooling hole 250 as may be used herein. As is shown, the cooling hole 250 includes a metering hole 260. The metering hole 260 may be sized for the desired airflow therethrough. The metering hole 260 may have a largely circular shape 270. Each of the cooling holes 250 may have an offset counter bore 280 therein. The offset counter bore 280 may have a substantial oval shape 290 such that the overall shape of the cooling hole 250 about the outer surface 110 also may have a substantial oval shape 300. Other sizes, shapes, and configurations also may be used herein.

Figure 10:
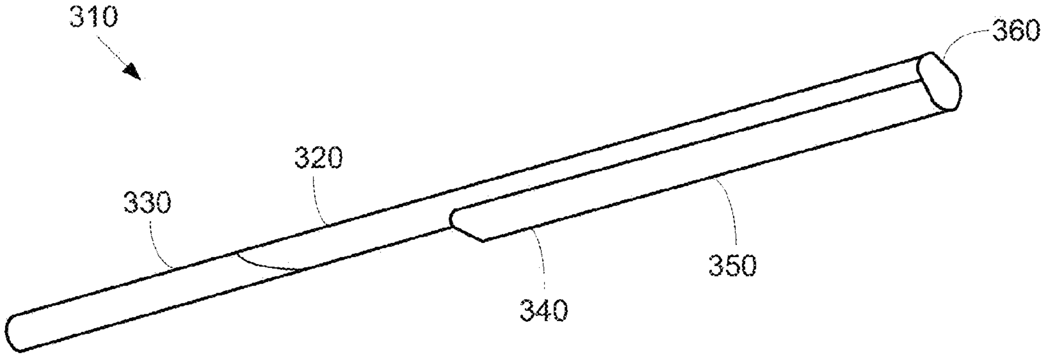
FIG. 10 is a side view of an alternative embodiment of a cooling hole as may be described herein.

FIG. 10 shows a further example of a cooling hole 310 as may be used herein. As is shown, the cooling hole 310 includes a metering hole 320. The metering hole 320 may be sized for the desired airflow therethrough. The metering hole 320 may have a largely circular shape 330. The cooling hole 310 also may have an offset counter bore 340 therein. The offset counter bore 340 may have a substantial expanded oval shape 350 such that the overall cooling hole 310 may have a substantial pear shape 360 about the outer surface 110. Other sizes, shapes, and configurations also may be used herein.

Figure 11:
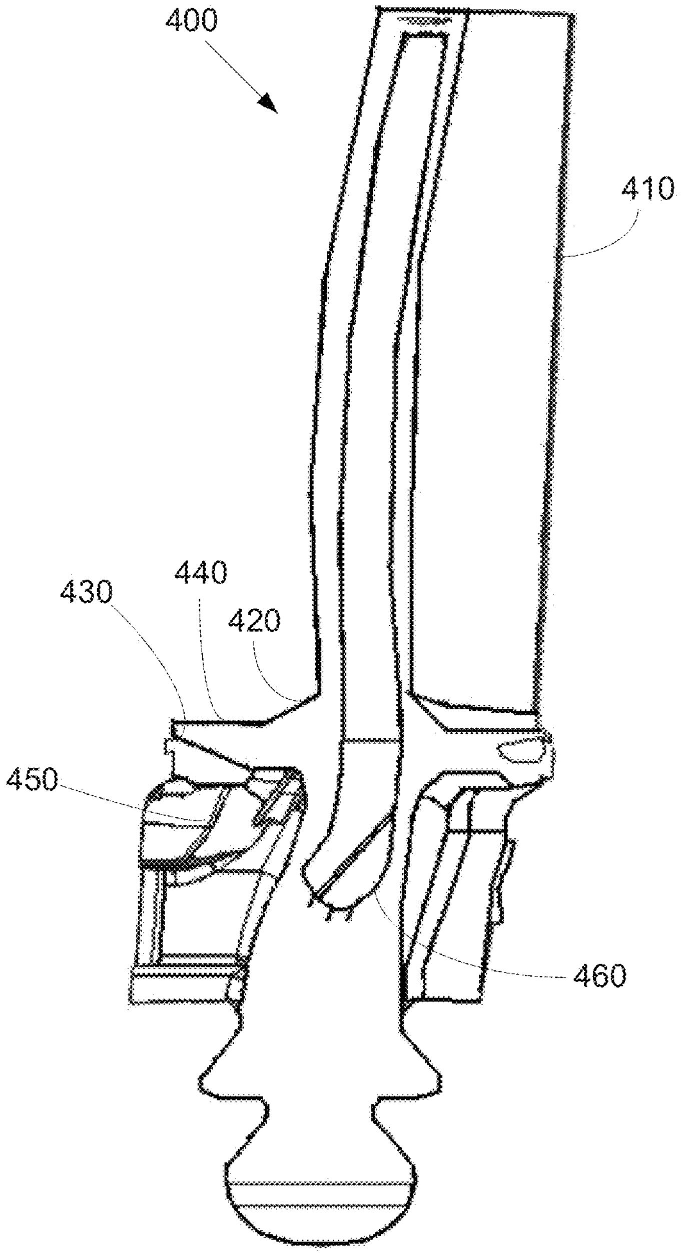
FIG. 11 is a side view of a bucket with a cooling hole as described herein extending through a platform.

In addition to the airfoils described herein, the cooling holes may be used on any type of coated turbine component. For example, the cooling holes may be used on shrouds, nozzle sidewails, bucket platforms, and the like. For example, FIG. 11 shows a bucket 400. The bucket 400 may include an airfoil 410 extending from a platform 420. One or more cooling holes 430 thus may extend from an outer surface 440 of the platform 420 to an internal shank cavity 450 positioned between adjacent buckets. One or more further cooling holes 430 may extend from the outer surface 440 of the platform 420 to an internal cooling passage 460. Other locations and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. An airfoil for use in a turbine, comprising:

a wall comprising an outer surface;

an internal cooling plenum; and a cooling hole extending from the outer surface of the wall to the internal cooling plenum, the cooling hole comprising an offset counterbore and a metering hole in communication with the offset counterbore;

wherein the offset counterbore comprises an amount of a spray coating therein while the metering hole remains unobstructed.

2. The airfoil of claim 1, wherein the offset counterbore extends away from the outer surface.

3. The airfoil of claim 1, wherein the metering hole extends to the outer surface.

4. The airfoil of claim 1, wherein the metering hole extends close to the outer surface.

5. The airfoil of claim 1, wherein the metering hole is sized for a cooling flow therethrough.

6. The airfoil of claim 1, wherein the offset counterbore comprises a coating collector for an amount of a spray coating therein.

7. The airfoil of claim 1, wherein the cooling hole comprises a front side and a back side along the wall and wherein the offset counterbore is positioned about the backside.

8. The airfoil of claim 1, wherein the internal cooling plenum is in communication with a cooling flow.

9. The airfoil of claim 1, further comprising a plurality of cooling holes therein.

10. The airfoil of claim 1, wherein the wall comprises a depth as low as about 0.03 inches (which is about 0.762 millimeters).

11. The airfoil of claim 1, wherein the offset counterbore comprises a circular shape, an oval shape, or an expanded oval shape.

12. A method of manufacturing an airfoil for use with a turbine, comprising:

positioning a cooling hole in a wall of the airfoil in communication with an internal cooling plenum;

providing the cooling hole with a metering hole and an offset counterbore;

spraying a coating onto the airfoil;

accumulating an amount of the coating within the offset counterbore; and maintaining the metering hole unobstructed by the coating.

13. A turbine component, comprising:

a wall with an outer surface;

an internal cavity; and a plurality of cooling holes extending through the wall from the outer surface to the internal cavity;

wherein each of the plurality of cooling holes comprises a metering hole that extends to the outer surface and an offset counterbore extending away from the outer surface.

14. The turbine component of claim 13, wherein the turbine component comprises an airfoil.

15. The turbine component of claim 14, wherein the internal cavity comprises a cooling plenum.

16. The turbine component of claim 13, wherein the turbine component comprises a platform.

17. The turbine component of claim 16, wherein the internal cavity comprises a shank cavity.

* * * * *

UNITED STATES PATENT AND TRADEMARK OFFICE

CERTIFICATE OF CORRECTION

PATENT NO. : 8,915,713 B2
APPLICATION NO. : 13/245990
DATED : December 23, 2014
INVENTOR(S) : Boyer It is certified that error appears in the above-identified patent and that said Letters Patent is hereby corrected as shown below:

In the Specification

In Column 3, Line 26, delete “counterhore” and insert -- counterbore --, therefor.

In Column 4, Line 30, delete “sidewails,” and insert -- sidewalls, --, therefor.

Signed and Sealed this
Twenty-eighth Day of April, 2015

Michelle K. Lee
*Director of the United States Patent and Trademark Office*